US009136968B2

(12) United States Patent
Lee et al.

(10) Patent No.: US 9,136,968 B2
(45) Date of Patent: Sep. 15, 2015

(54) TIME AND WAVELENGTH DIVISION MULTIPLEXING—PASSIVE OPTICAL NETWORK (TWDM-PON) SYSTEM AND COMMUNICATION LINK METHOD THEREOF

(71) Applicant: Electronics and Telecommunications Research Institute, Daejeon-si (KR)

(72) Inventors: Han-Hyub Lee, Daejeon-si (KR); Sang-Soo Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 24 days.

(21) Appl. No.: 14/092,260

(22) Filed: Nov. 27, 2013

(65) Prior Publication Data

US 2014/0161461 A1   Jun. 12, 2014

(30) Foreign Application Priority Data

Nov. 28, 2012  (KR) .................. 10-2012-0136475
Nov. 27, 2013  (KR) .................. 10-2013-0145630

(51) Int. Cl.
*H04J 3/06* (2006.01)
*H04J 14/02* (2006.01)

(52) U.S. Cl.
CPC ........... *H04J 3/0682* (2013.01); *H04J 14/0226* (2013.01); *H04J 14/0238* (2013.01); *H04J 14/0282* (2013.01)

(58) Field of Classification Search
CPC .............. H04J 14/0224; H04J 14/0227; H04J 14/0228; H04J 14/023; H04J 14/0232; H04J 14/0234; H04J 14/0235; H04J 14/0236; H04J 14/0238; H04J 14/0239; H04J 14/0245; H04J 14/0246; H04J 14/0252; H04J 14/08; H04J 2014/0241; H04J 2014/0242; H04J 2014/0253
USPC ..................... 398/58, 66–72, 74, 75
See application file for complete search history.

(56) References Cited

U.S. PATENT DOCUMENTS 5,005,166 A * 4/1991 Suzuki et al. .................. 398/47
7,826,745 B2 * 11/2010 DeCusatis et al. ............. 398/75

(Continued)

FOREIGN PATENT DOCUMENTS

JP       2012-023628 A     2/2012

OTHER PUBLICATIONS

International Telecommunication Union, "Multiple Wavelength Passive Optical Networks (MW-PON)" ITU-T G.multi, Sep. 2012.

*Primary Examiner* — Dalzid Singh
(74) *Attorney, Agent, or Firm* — Rabin & Berdo, P.C.

(57) ABSTRACT

A Time Wavelength Division Multiplexing-Passive Optical Network (TWDM-PON) system and a communication link method thereof are provided. The communication link method is a method whereby an Optical Network Unit (ONU) which has established communication link to one Optical Line Terminal (OLT) establishes communication link to a different OLT. The ONU receives a wavelength change instruction to change a wavelength thereof to an operating wavelength assigned to the different OLT, and change the wavelength in response to the wavelength change instruction to synchronize to a downstream signal of the operating signal. In addition, the ONU receives an upstream discovery grant signal from the different OLT, and transmits an acknowledgement message to notify the receipt of the upstream discovery grant signal, so that the ONU establishes communication link to the different OLT.

19 Claims, 8 Drawing Sheets

(56) References Cited

U.S. PATENT DOCUMENTS

| | | | |
|---|---|---|---|
| 8,554,079 B2 * | 10/2013 | Liu et al. | 398/69 |
| 2006/0239682 A1 * | 10/2006 | Park et al. | 398/71 |
| 2014/0050479 A1 * | 2/2014 | Luo et al. | 398/68 |
| 2014/0093232 A1 * | 4/2014 | Hood | 398/5 |
| 2014/0161446 A1 * | 6/2014 | Lee et al. | 398/34 |

* cited by examiner

TIME AND WAVELENGTH DIVISION MULTIPLEXING—PASSIVE OPTICAL NETWORK (TWDM-PON) SYSTEM AND COMMUNICATION LINK METHOD THEREOF

CROSS-REFERENCE TO RELATED APPLICATION(S)

This application claims the benefit under 35 U.S.C. §119 (a) of Korean Patent Application Nos. 10-2012-0136475, filed on Nov. 28, 2012, and 10-2013-0145630, filed on Nov. 27, 2013, in the Korean Intellectual Property Office, the entire disclosures of which are incorporated herein by references for all purposes.

BACKGROUND

1. Field

The following description relates to a Time and Wavelength Division Multiplexing-Passive Optical Network (TWDM-PON) system and a communication link method thereof.

2. Description of the Related Art

A Time Division Multiplexing Passive Optical Network (TDM-PON), such as Ethernet Passive Optical Network (EPON) and Gigabit capable PON (GPON), connects a central office and subscribers using a single upstream wavelength optical signal and a single downstream wavelength optical signal. In addition, the TDM-PON employs an optical splitter that does not require power consumption to connect a central office and subscribers. Due to these advantages, TDM-PON has been widely deployed and used worldwide. In particular, the GPON is now common across the North America and European countries. In 2010, an International Telecommunications Union Telecommunication (ITU-T) has developed G.987 XG-PON recommendation and now an early-stage commercial product has been released. In addition, Full Service Access Network (FSAN), an ITU-T SG15 for the world's leading telecommunications services providers and equipment suppliers to work toward pre-standardization, has adapted Time and Wavelength Division Multiplexing Passive Optical Network (TWDM-PON) as a main technology. ITU-T is now discussing adaption of TWDM-PON as G.989.x recommendation.

FIG. 1 is a block diagram illustrating a PON, such as TDM-PON, P-to-P, RF video overlay, which accommodates a plurality of heterogeneous services using Wavelength Division Multiplexing (WDM) within a single network. In FIG. 1, a Second Next Generation Passive Optical Networks (NG-PON2) system may be a hybrid system that combines TDM and WDM. NG-PON2 system is structured to accommodate a plurality of heterogeneous and/or homogeneous service links using optical signals of multiple wavelengths. In addition, the NG-PON2 system is able to expand a transmission capacity according to a number of optical wavelength channels without changing an Optical Division Network (ODN).

Referring to FIG. 1, a NG-PON2 system, which is a kind of a TWDM-PON system, is a hybrid PON that accommodates a plurality of central offices and n number of Optical Line Terminals (OLTs) using different wavelengths. If it is assumed that each central office accommodates a single PON link, an ODN may accommodate a number of homogeneous or heterogeneous networks and each service may be distinguished by a wavelength of a used signal. In this case, Optical Network Units (ONUs) or NG-PON2 ONUs, which are user devices of the TWDM-PON system, receive from a plurality of NG-PON2 OLTs multi-wavelength downstream optical signals that are multiplexed optical signals of different wavelengths. In addition, it is required for each ONU to select a wavelength for an upstream signal corresponding to a downstream signal in order to communicate with a particular NG-PON2 OLT. Thus, each NG-PON2 ONU needs to include a tunable transceiver which is able to select a wavelength. The tunable transceiver includes a tunable laser and a tunable receiver.

FIG. 2 is a configuration diagram illustrating a concept of a TWDM-PON system that is a main technique of a next-generation PON. In FIG. 2, it is assumed that the TWDM-PON system includes n number of OLTs that use different wavelengths, and each OLT accommodates a single PON link. In addition, one ODN may accommodate N number of TDM-PONs, and each TDM-PON link may be distinguishable by a wavelength thereof that is independent of a wavelength used by a different TDM-PON link.

In the TWDM-PON system shown in FIG. 2, each OLT which has established communication link to a different ONU may be distinguished by used wavelengths (a downstream signal wavelength and a corresponding upstream signal wavelength). For example, at least one ONU (e.g., an ONU A) may communicate with an OLT #1 using communication wavelengths (a downstream wavelength $\lambda d1$ and an upstream wavelength of $\lambda u1$) of the OLT #1, and, similarly, an ONU B may communicate with an OLT #2 using communication wavelengths (a downstream wavelength of $\lambda d2$ and an upstream wavelength of $\lambda d2$) of the OLT #2. In this case, each ONU transmits an upstream signal to an OLT using a wavelength that matches or corresponds to a downstream signal assigned thereto. Specifically, different-wavelength upstream signals are multiplexed and then transmitted within the ODN, and the multiplexed upstream signals are split by a demultiplexer (that is, a WDM MUX located in a shared infrastructure) based on wavelengths and then transmitted to corresponding OLTs, respectively.

Meanwhile, downstream signals received from the OLTs are multiplexed by a wavelength multiplexer (which is within a shared infrastructure) and then split by a splitter within the ODN, so all the downstream signals are input to or received in each ONU. In addition, each ONU uses only an optical signal of a specific wavelength among all the received multi-wavelength optical signals using a tunable receiver.

Such a TWDM-PON system includes a plurality of OLTs, and traffic imbalance may be caused according to whether an ONU being communication-connected to any OLT operates. For example, ONUs which has established communication link to a particular OLT or the OLT #1 generate heavy traffics according to a network state or time, but ONUs being communication-connected to OLTs other than the particular OLT hardly generate traffics, so that it leads to traffic imbalance between PON links. In this case, traffic loads occurs in the OLT #1, especially a PON link of a wavelength that is used by the OLT 1#, so all the ONUs being communication-connected to the OLT #1 may not receive a service with decent quality and may not utilize the entire PON links efficiently. In addition, every OLT provides a service even during the night time where traffic loads are usually significantly reduced compared to the day time, so that network resources may be unnecessarily used

SUMMARY

In one general aspect, there is provided a Time Wavelength Division Multiplexing-Passive Optical Network (TWDM-PON) system, comprising: a service provider equipment configured to comprise a plurality of Optical Line Terminals (OLTs) and an OLT communicator, wherein each of the plurality of OLTs is configured to provide a service using an optical signal of a different wavelength in Time Division Multiplexing (TDM) scheme, and the OLT communicator is configured to support communication among the plurality of OLTs; a subscriber equipment configured to comprise a plurality of Optical Network Units (ONUs), each of the plurality of ONUs that utilizes a service provided from one of the plurality of OLTs using an arbitrary wavelength selected according to a wavelength control of the service provider equipment; and an Optical Distribution Network (ODN) configured to transmit multi-wavelength downstream optical signals from the service provider equipment to the subscriber equipment, and transmit multi-wavelength upstream optical signals from the subscriber equipment to the service provider equipment, wherein the plurality of OLTs comprises a first OLT and a second OLT, and a first ONU of the plurality of the ONUs, which have established communication link to the first OLT, establishes communication link to the second OLT.

The OLT communicator may be further configured to transmit equipment specific information of the first ONU to the second OLT.

The equipment specific information of the first ONU may include ONU identification (ONU ID) and a serial number of the first ONU.

The first OTL may transmit a wavelength change instruction to the first ONU in order to change a wavelength thereof to an operating wavelength allocated to the second OLT, and the second OLT may periodically transmit an upstream discovery grant signal to the first ONU.

The wavelength change instruction may include ODN ID of the first ONU and information about the operating wavelength allocated to the second OLT.

The wavelength change instruction may further include information on a point of time when the first ONU starts a tuning process to change the wavelength thereof.

The second OLT may be further configured to periodically transmit the upstream discovery grant signal until a message notifying receipt of the upstream discovery grant signal is received from the first ODN or until a predetermined timer expires.

The second OLT may transmit the upstream discovery grant signal to the first ONU after the first OLT transmits the wavelength change instruction to the first ONU.

The first ONU may change the wavelength thereof to the operating wavelength allocated to the second OLT, immediately after receiving the wavelength change instruction.

The changing the wavelength thereof may include making preparation to change a wavelength, changing a wavelength of a tunable transceiver included in the first ONU, and changing the wavelength to synchronize to a downstream signal transmitted from the second OLT.

In another general aspect, there is provided a communication link method for establishing communication link in a Time Wavelength Division Multiplexing-Passive Optical Network (TWDM-PON) system, wherein a first ONU which has established communication link to a first OLT establishes communication link to is a second OLT, the communication link method comprising: receiving from the first OLT a wavelength change instruction requesting to change a wavelength to an operating wavelength allocated to the second OLT; in response to the wavelength change instruction, changing the wavelength to synchronize to a downstream signal of the operating wavelength; and receiving an upstream discovery grant signal from the second OLT and transmitting a signal notifying receipt of the upstream discovery grant signal to the second OLT.

The second OLT may receive equipment specific information of the first ONU before transmitting the upstream discovery grant signal.

The equipment specific information may include ONU identification (ONU ID) and a serial number of the first ONU.

The TWDM-PON system may further include an OLT communicator configured to support communication between a plurality of OLTs.

The wavelength change instruction may include ONU ID of the first ONU and information on the operating wavelength allocated to the second OLT.

The wavelength change instruction may further include information on a point of time when the first ONU starts a tuning process to change a wavelength.

The second OLT may periodically transmit the upstream discovery grant signal until a message notifying receipt of the upstream discovery grant signal is received from the first ONU or until a predetermined timer expires.

The second OLT may transmit the upstream discovery grant signal to the first ONU after the first OLT transmits the wavelength change instruction to the first ONU.

The first ONU may change the wavelength to the operating wavelength allocated to the second OLT, immediately after receiving the wavelength change instruction.

The changing of the wavelength may include making preparation to change a wavelength; changing a wavelength of a tunable transceiver included in the first ONU, and synchronizing to a downstream signal transmitted from the second OLT.

Other features and aspects may be apparent from the following detailed description, the drawings, and the claims.

Figure 1:
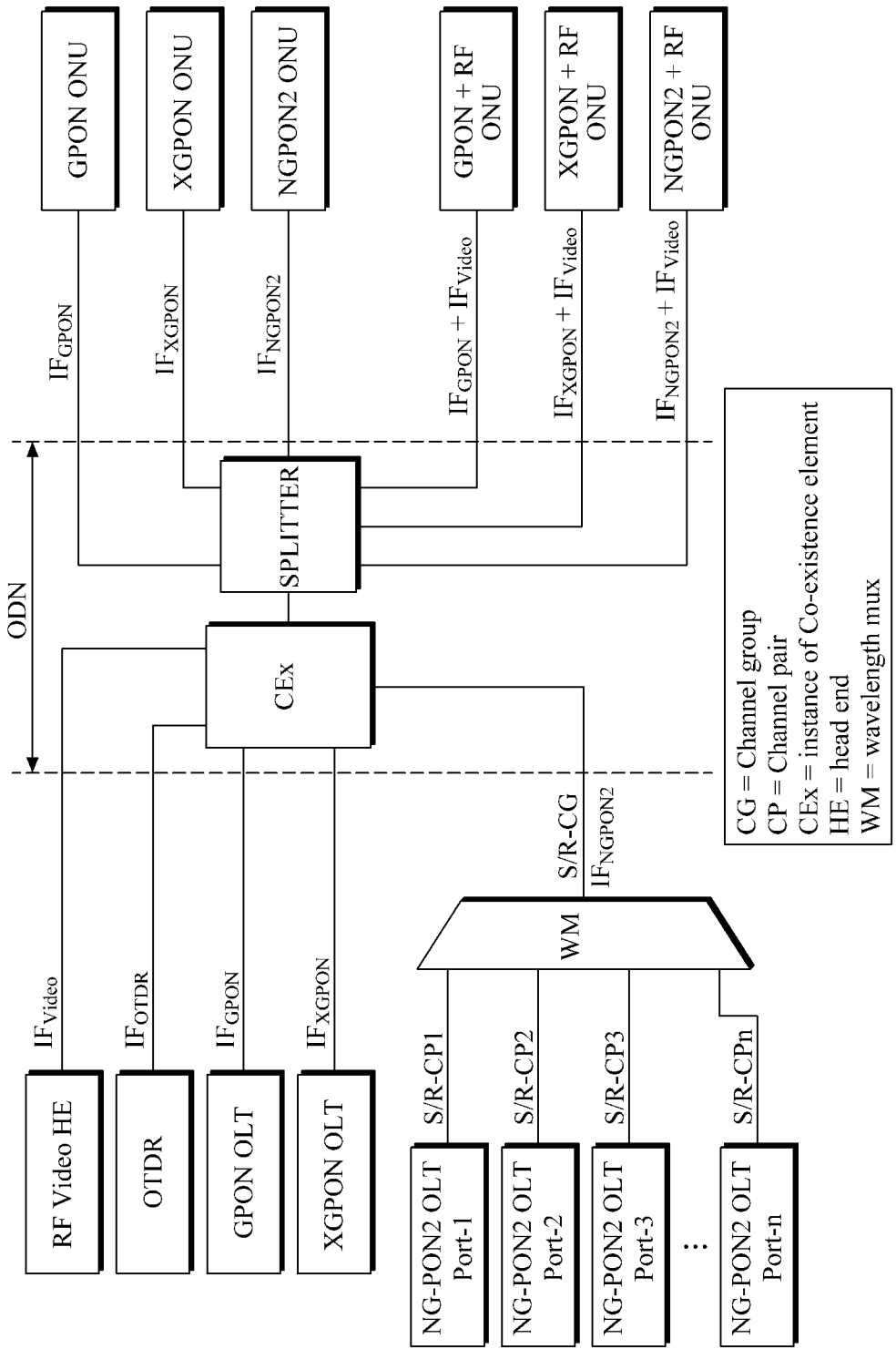
FIG. 1 is a configuration diagram illustrating a Passive Optical Network (PON) system capable of accommodating a plurality of homogeneous services by applying Wavelength Division Multiplexing (WDM) to an existing PON.
Figure 2:
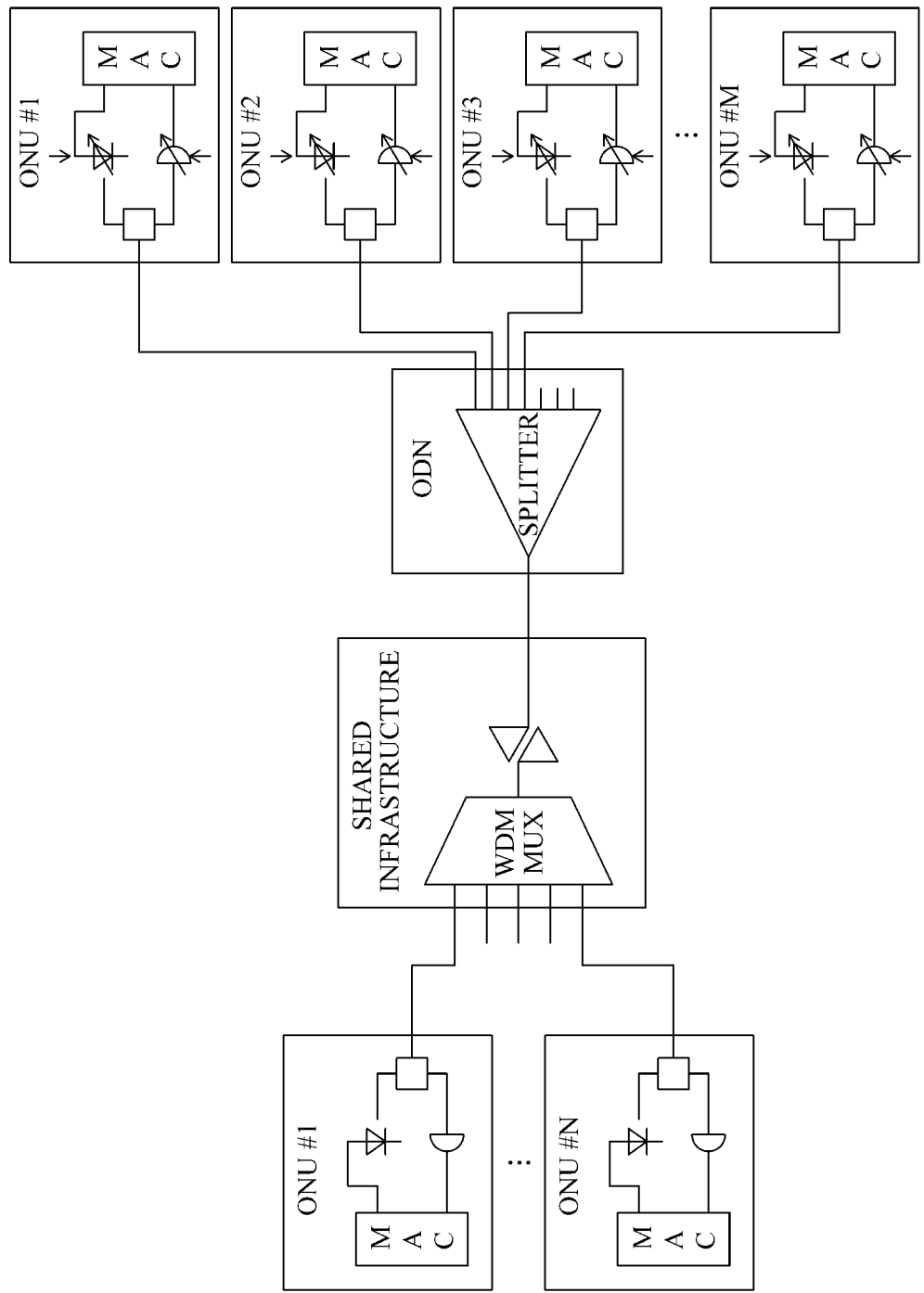
FIG. 2 is a diagram illustrating an example of a Time Wavelength Division Multiplexing-Passive Optical Network (TWDM-PON) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

As described above, in the TWDM-PON system, each of a plurality of ONUs selects a specific wavelength among multiple wavelengths for signals provided by a plurality of OLTs, and communicates with an OLT using the specific wavelength. The TWDM-PON system is able to perform load-balancing according to traffic condition by initially setting a connection between a specific OLT and a specific ONU or changing the connection. If efficient load-balancing is possible, the TWDM-PON system is able to actively and aggressively cope with traffic flow that is changed according to time periods, enabling to connect an ONU, which has established communication link to an OLT with heavy traffic, to another OLT with less traffic so that traffic cannot be loaded on a specific OLT.

Figure 3:
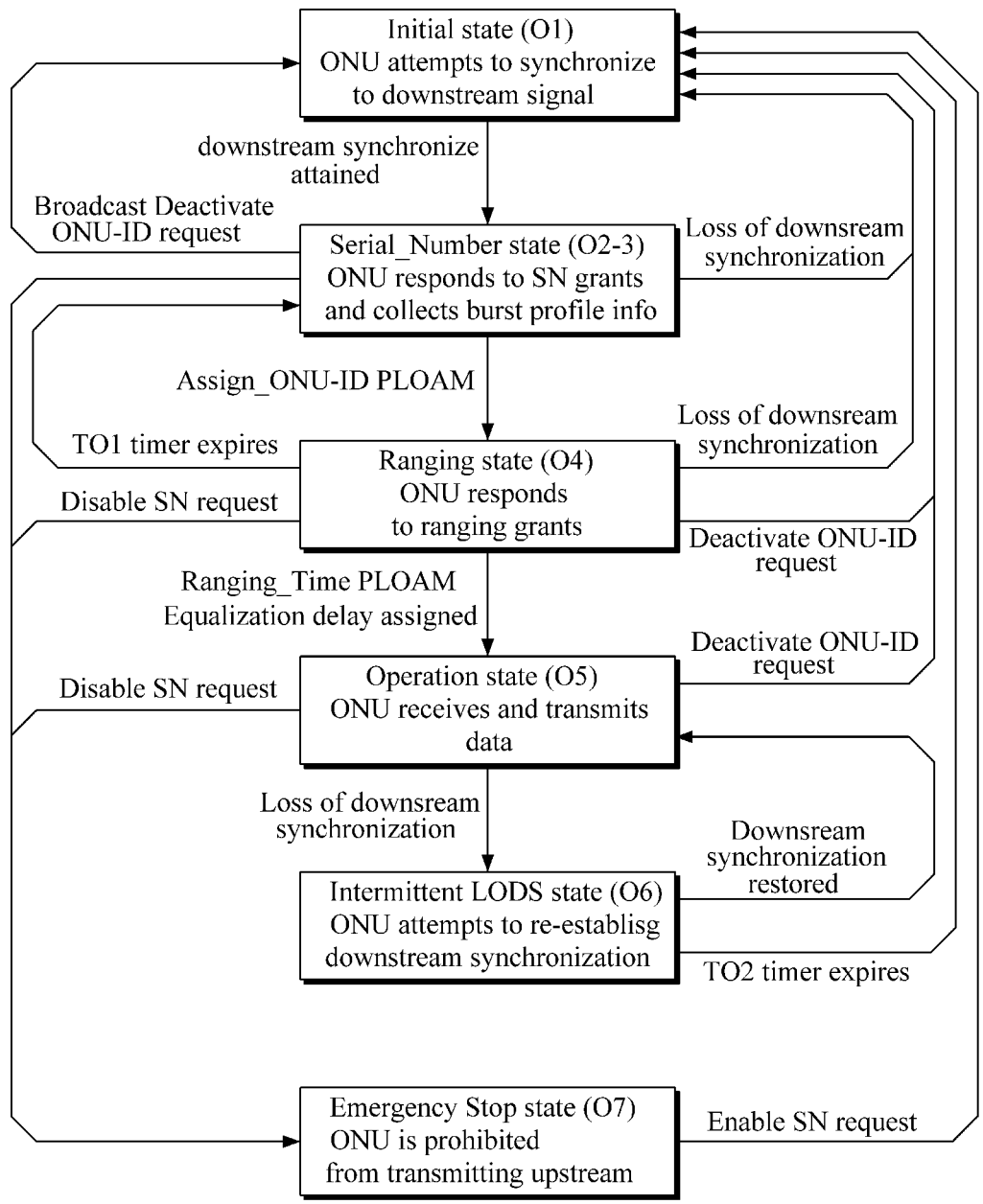
FIG. 3 is a flow chart illustrating a procedure how communication link is established between an Optical Line Terminal (OLT) and an Optical Network Unit (ONU) in a Gigabit-capable Passive Optical Network (G-PON) system that is one of examples of the Time Division Multiplexing-Passive Optical Network (TDM-PON) system.

For load-balancing in the TWDM-PON system, an OLT needs to be informed of information on an ONU to which the OLT will establish communication link. That is, the OLT needs to check whether the corresponding ONU is registered in the TWDM-PON system or in a service provided through the TWDM-PON system. It is because the currently-discussed TVs/DM-PON system employs the same ONU registration method as that of the existing TDM-PON system, the method which requires an OLT to be previously informed of information on an ONU to which the OLT wants to establish communication link FIG. 3 is a flow chart illustrating a procedure on how communication link is established between an OLT and an ONU in a G-PON system that is one of examples of the TDM-PON system. The flow chart in FIG. 3 is demonstrated in the published standard for G-PON system (ITU-T G.987.3), so brief descriptions is herein provided with respect to the flow chart. In addition, the standard for G-PON system may be applied for any descriptions not provided herein.

Referring to FIG. 3, an ONU enters an initial state (O1) to establish communication link to an OLT. In the initial state, the ONU attempts to synchronize itself to a downstream signal transmitted from the OLT. When the ONU is synchronized to the downstream signal, the ONU enters a serial number state (O2 and O3). In the serial number state, the ONU transmits a serial number and equipment specific information of its own to the OLT in order to notify an intention for communication. Then, the ONU collects burst profile information from the OLT. Then, the OLT checks whether the serial number of the ONU is registered, and, if permitting communication link to the ONU, allocates ONU identification (ONU ID) to the ONU. Then, the ONU enters a ranging state (O4) and an operation state (O5) to receive a service. The operation state (O5) indicates a state in which communication link between the ONU and the OLT has been established. In the above-described state, an OLT may refuse registering an ONU or may cancel or delay a service by sending a Disable SN request to a registered ONU. In response to the disable SN request, the registered ONU enters to an emergency stop state (O7) to wait re-permission from the OLT.

According to the above-described communication link method for establishing communication link between an ONU and an OLT in the G-PON system, the OLT needs to attain equipment specific information of the ONU, including a serial number of the ONU, which aims to request communication link to the ONU. The equipment specific information of the ONU is needed to check whether the ONU is registered in the corresponding G-PON system. A conventional G-PON system includes only one OLT, and may have equipment specific information of every ONU registered therein. However, the TWDM-PON system includes a plurality of OLTs, and thus, does not have equipment specific information of every ONU (especially, an ONU which has established communication-connected to a different OLT). In order to help a specific ONU to switch an OLT to which the specific ONU has established communication link to another OLT, it is required for each OLT in the TWDM-PON system to include not just equipment specific information of an ONU which has established communication link thereto, but equipment specific information of ONUs which have established communication link to other OLTs. If necessary, each OLT even attains the equipment specific information of ONUs which have established communication link to other OLTs in real time. Accordingly, if necessary, a means and/or method whereby a plurality of OLTs share equipment specific information of every ONU registered in the TWDM-PON system, and a means and/or method for attaining equipment specific information of ONUs which have communication link to other OLT, are required.

Figure 4:
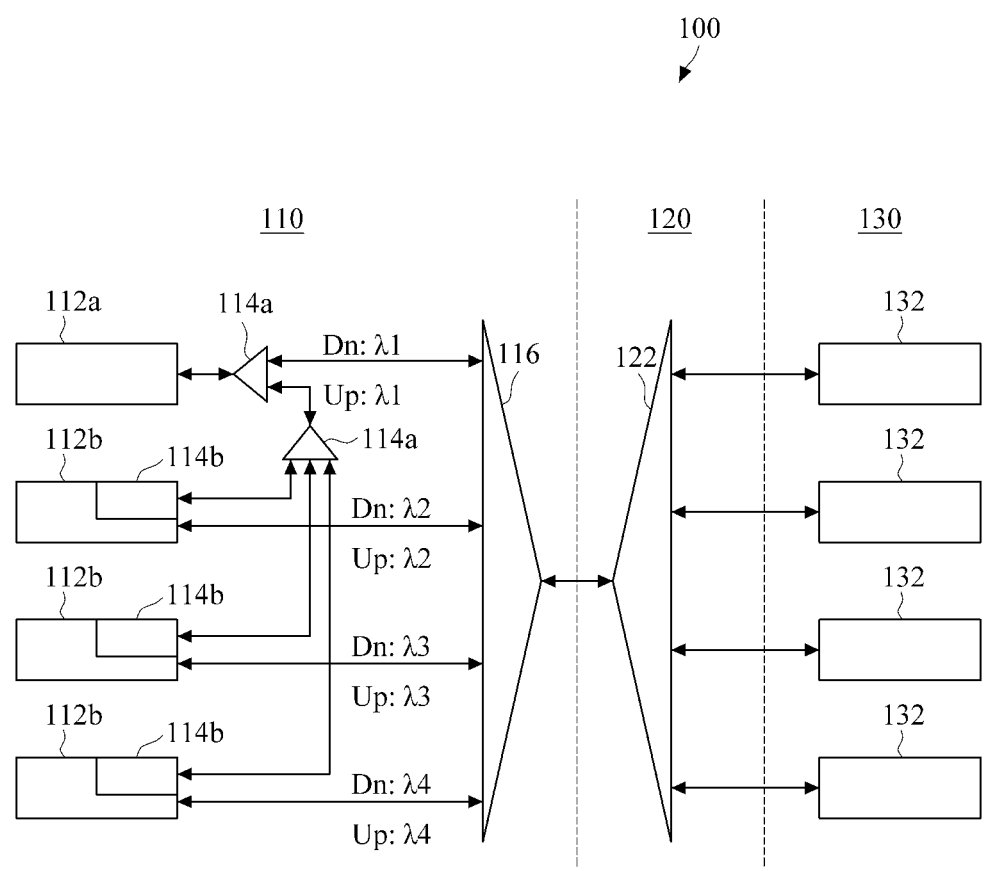
FIG. 4 is a configuration diagram illustrating an example of a TWDM-PON system according to an exemplary embodiment.

FIG. 4 is a configuration diagram illustrating an example of a TWDM-PON system according to an exemplary embodiment. Referring to FIG. 4, a TWDM-PON system 100 includes a service provider equipment 110, an Optical Division Network (ODN) 120, and a subscriber equipment 130. The configurations of the service provider equipment 110, the ODN 120, and the subscriber equipment 130 in FIG. 4 are merely exemplary. In addition, the TWDM-PON system 100 further includes OLT communicators 114a and 114b.

The service provider equipment 110 may include a plurality of OLTs 112a and 112b and a wavelength multiplexer/demultiplexer 116. Each of the OLTs constituting the service provider equipment 110 is a terminal that provides a service using a single wavelength, and a plurality of OLTs or each OLT may constitute one system. FIG. 4 demonstrates a case where the service provider equipment 110 includes four OLTs 112a and 112b, but it is merely exemplary. The service provider equipment 110 including a plurality of OLTs, for example, the four OLTs, may be a hybrid system that combines TDM and WDM. This configuration is adequate for accommodating a plurality of homogeneous or heterogeneous service links using multi-wavelength optical signals. If it is assumed that each OLT accommodates a single TDM-PON link, an ODN may accommodate n number (n=4 in FIG. 4) of homogeneous or heterogeneous networks, and each service may be distinguished by a wavelength of a used signal. In addition, the wavelength multiplexer/demultiplexer 116 multiplexes multi-wavelength light (downstream signals) output from a plurality of OLTs 112a and 112b, transmits the wavelength-multiplexed light to the subscriber equipment 130 over the ODN 120, demultiplexes the wavelength-multiplexed light (upstream signals) transferred over the ODN 120, and transmits the wavelength-demultiplexed light (upstream signals) to the corresponding OLTs 112a and 112b.

The service provider equipment 110 may further include the OLT communicators 114a and 114b. The OLT communicators 114a and 114b are designed for communication between OLTs in a plurality of PON links in the TWDM-PON system 100. The communication between OLTs through the OLT communicators 114a and 114b may be utilized for discovering an ONU 132 and switching an OLT to another OLT among the OLTs 112a and 112b to establish communication link to the ONU 132.

For example, communication between OLTs may be utilized for tuning a wavelength of an ONU. More specifically, in a case where an ONU is added to an ODN, the ONU tunes a tunable receiver to a first wavelength that enables the ONU to discover a working system. After having tuned the tunable receiver, the ONU tunes a tunable transceiver to a tuned wavelength of the tunable receiver. In this case, the tunable transceiver may communicate with the OLT using a wrong wavelength, and thus, the OLT cannot communicate with the ONU. An OLT communication protocol enables the OLT to communicate with other OLTs, so that the ONU may not communicate with other OLTs or the ONU (either or both a transmitter and a receiver thereof) may change a wavelength thereof to a wavelength of a different OLT.

In another example, communication between OLTs may be utilized for ONU activation. If an OLT is capable of notifying an ONU of an appropriate wavelength, the ONU may discover a system or precede a ranging process more effectively. Specifically, when an ONU tunes a tunable receiver to a specific wavelength, an OLT checks protocol database, sends a query for a destination wavelength to a different OLT, and then transfers information on an assigned wavelength to the ONU. Such a communication protocol between OLTs helps to determine a final wavelength of the ONU efficiently.

In addition, the OLT communicators 114a and 114b are necessary for the OLTs 112a and 112b constituting the service provider equipment 110 to receive and transmit equipment specific information of each ONU 132. In this embodiment, there is no limitation on the configuration of the OLT communicators 114a and 114b, and one exemplary configuration of the OLT communicators 114a and 114b is illustrated in FIG. 4. The configuration of the OLT communicators 114a and 114b shown in FIG. 4 may be an example in which one OLT 112a is a master OLT and the other OLTs 112b are slave OLTs.

Referring to FIG. 4, the OLT communicators 114a and 114b includes at least one power splitter 114a and at least one embedded Optical Network Terminal (ONT) 114b. A power splitter 114a may be a means for splitting light output from the master OLT 112a and transferring the split light to each of the slave OLTs 112b. FIG. 4 demonstrates a case where two power splitters 114a are provided, but it is merely exemplary. In addition, an embedded ONTs 114b is used for communication between the master OLT 112a and/or a slave OLT 112b. For example, an embedded ONT 114b included in each slave OLT 112b may receive split light from a power splitter 114a.

The ODN 122 allocates downstream signals multiplexed by the wavelength multiplexer/demultiplexer 116 to respective ONUs 132. Herein, the light allocated to the ONUs 132 may include all the wavelength downstream signals. In addition, the ODN 112 may multiplex specific-wavelength upstream signals received from a plurality of ONUs 132 to be transmitted to the wavelength multiplexer/demultiplexer 116 of the service provider equipment 110.

The subscriber equipment 130 includes a plurality of ONUs 132. FIG. 4 demonstrates a case where four ONUs are provided, but it is merely exemplary. All or some of the ONUs 132 may be Next Generation-Passive Optical Network 2 (NG-PON2) ONUs. A NG-PON2 ONU may receive wavelength-multiplexed downstream optical signals from a plurality of NG-PON2 OLTs. To this end, each ONU 132 may include a tunable transceiver which is able to select a wavelength.

Hereinafter, how the system configured as in FIG. 4 operates is described in detail. The master OLT 112a may communicate with a first ONU group including at least one ONU 132 using a downstream signal of a specific wavelength $\lambda 1$ and a corresponding upstream signal of a specific wavelength $\lambda'1$. In addition, the master OLT 112a may communicate with an embedded ONT 114b of each slave OLT 112b through the power splitter 114a. Furthermore, each slave OLT 112b may communicate with a second ONU group including at least one ONU 132 using downstream signals of specific wavelengths $\lambda 2$, $\lambda 3$ and $\lambda 4$ and corresponding upstream signals of specific wavelengths $\lambda'2$, $\lambda'3$ and $\lambda'4$, while communicating with the master OLT 112a through the embedded ONT 114b.

The master OLT 112a may receive equipment specific information of at least one ONU in an ONU group from OLTs 112b that has established communication link through the power splitter 114a and the embedded ONTs 114b. The equipment specific information includes information required for an ONU to operate with communication link established between the ONU and a particular OLT. For example, the equipment specific information may include identification (ID) and a serial number of a terminal.

In addition, the master OLT 112a may receive traffic condition information of a PON link thereof from a slave OLT 112 which has established communication link thereto. The traffic condition information received from each slave OLT 112b may be used by the master OLT 112a as resource for load balancing. For example, the master OLT 112a may render all or some of the ONUs, which have established communication link to an OLT that is imposed with relatively heavy traffic, to establish communication link to another OLT imposed with relatively less traffic based on the received traffic condition information, thereby changing the communication link between the ONU and the OLTs. In this case, the master OLT 112a and/or slave OLTs 112b may operate in response to load balancing related signal received from the outside.

The master OLT 112a may request a corresponding slave OLT 112b, for example, a first slave OLT, for equipment specific information of a corresponding ONU, and receive the equipment specific information of the corresponding ONU. Alternatively, the master OLT 112a may receive equipment specific information of a corresponding ONU in response to a request from a first slave OLT.

The master OLT 112a itself may establish communication link to the corresponding ONU using the received equipment specific information. Alternatively, instead of establishing communication connection to the ONU, the master OLT 112a may transmit the received equipment specific information of the ONU to the second slave OLT, so that another slave OLT 112b, that is, the second slave OLT 112b, may establish communication link to the ONU. In the latter case, the master OLT 112a may transmit to the first slave OLT information on an optical signal wavelength that the second slave OLT uses to establish communication link to the ONU. Then, the first slave OLT may transmit the received information on an optical signal wavelength to the corresponding ONU in order to request that the ONU change a wavelength thereof to the wavelength used by the second slave OLT.

In one aspect of this embodiment, the master OLT 112a may be one of a plurality of OLTs that has established communication link to at least one ONU to provide a service, as shown in FIG. 4. In this case, the master OLT 112a may or may not include an embedded ONT. Alternatively, the master OLT 112a may be an additional device that has not established communication link to at least one ONU over the ODN 120. In this case, the master OLT 112a may communicate with a slave OLT 112a through the power splitter 114a, but not through the wavelength multiplexer/demultiplexer 116. That is, the master OLT 112a may simply manage other OLTs 112b, but not providing a service to the ONUs 132.

As described above, it is possible to achieve for load balancing between OLTs in the TWDM-PON system by adaptively switch an OLT to which an ONU has established communication link to another OLT based on traffic condition of each PON link. Alternatively, after a particular OLT makes every ONU which establish communication link thereto to establish communication link to a different OLT, the particular OLT may be turned off or perform management jobs such as maintenance. In this case, in the perspective of the TWDM-PON system, only some OLTs operate in the night during so less traffic is generated, so that unnecessary power consumption is avoidable and/or effective system maintenance is possible.

Furthermore, in the TVs/DM-PON system in which an OLT, to which a particular ONU has established communication link, may be switched to another OLT, it is possible not only to achieve load balancing and/or system power saving, but also to support an ONU's wrong OLT access (which means that the ONU establishes communication link to a wrong ODN) so that the ONU may establish communication link to a proper OLT. To this end, an OLT which corresponds to an ONU placed in a different ODN may send a query to a different OLT or a master OLT, or may report the ONU's location in the ODN.

Hereinafter, a communication link method in the TWDM-PON system is provided. It is obvious for those skilled in the art that the communication link method can be applied not simply to the TWDM-PON system shown in FIG. 4, but also a TWDM-PON system that allows OLTs to communicate with one another through an OLT communicator, the system which is different from the TWDM-PON system shown in FIG. 4. In addition, the communication link method described in the following may be performed in a way that is in consistent with or even adapt a communication link method whereby an ONU is registered in or has communication link to an OLT in the existing TDM-PON system, such as EPON, GPON, XGPON and 10G-EPON.

Figure 5:
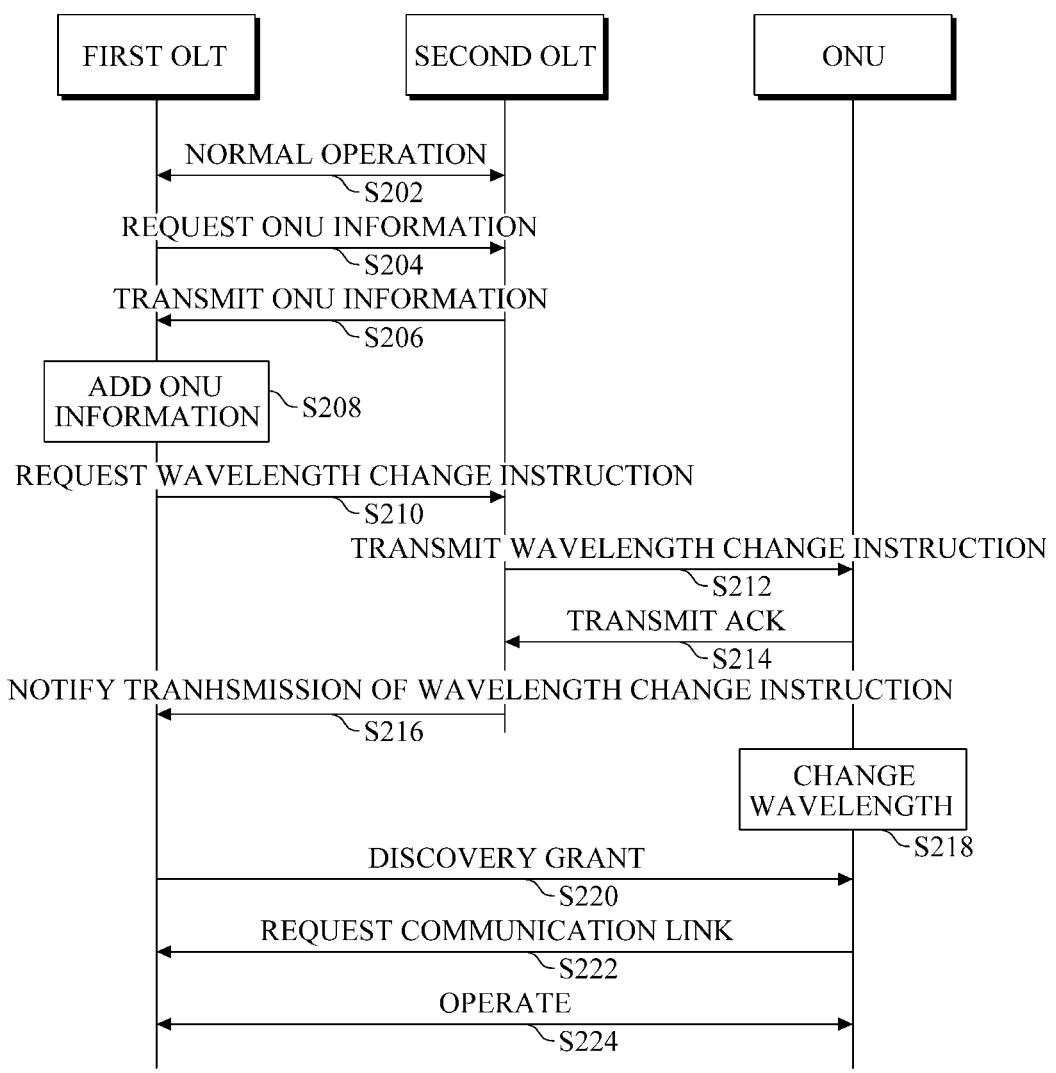
FIG. 5 is a flow chart illustrating a communication link method according to an exemplary embodiment.

FIG. 5 is a flow chart illustrating a communication link method according to an exemplary embodiment. The flow chart shown in FIG. 5 is an example in which an ONU switches a first OLT to which the ONU has established communication link to a second OLT. That is, it is an example in which an ONU tunes itself to an operating wavelength (including both a downstream wavelength and an upstream wavelength) of a second OLT. It is obvious for those skilled in the art that the communication link method provided in the following may be applied to a TWDM-PON system which allows communications between OLTs, the system which is different from the TWDM-PON system shown in FIG. 4.

Referring to FIG. 5, the first and second OLTS are in normal operation in 202. The 'normal operation between the first and second OLTs' indicates a state in which communication between the first and second OLTs is available through an OLT communicator (not shown) of the system. In addition, the first and second OLTs are service provider equipments different from each other or the same service provider equipments with different ports. Alternatively, the first and second OLTs are able to communicate with each other through an embedded ONT or through a different communication circuit of the system. In some cases, medium access controls (MAC) constituting each of the first and second OLTs may establish communication link directly to each other. In addition, in any cases, the first OLT is allocated with a first wavelength (both an upstream wavelength and a downstream wavelength), and the second OLT is allocated with a second wavelength (both an upstream wavelength and a downstream wavelength) that is different from the first wavelength.

Although not illustrated in FIG. 5, in operation S202, an ONU may be allocated to or has established communication link to the second OLT. In addition, a determination may have been made that the ONU switches the second OLT to which the ONU has established communication link to the first OLT. In this embodiment, there is no limitation on an entity or a cause for switching the second OLT to which the ONU has established communication link to the first OLT.

In response to a determination that a second OLT, which has established communication link to the ONU, is switched to the first OLT, the first and second OLTs communicate with each other to exchange necessary information in S204 to S210. The information exchanged during this procedure (operation S204 to S210) may include at least equipment specific information of an ONU that switches an OLT to another OLT. In this embodiment, the equipment specific information of the ONU is provided by the second OLT (an OLT to which the ONU has established communication link) to the first OLT (an OLT to which the ONU will establish communication link).

FIG. 5 illustrates an example of the above-described procedure. That is, all or a part of operation S204 to S210 may be arbitrary. As an example of the former case, if a first OLT is previously informed of information on an ONU to which the OLT will establish communication link, or if the first OLT has already obtained from a different device (e.g., a master OLT of a TWDM-PON system) the information on an ONU to which the OLT will establish communication link, operations S204 to S210 may be omitted. As an example of the latter case, only operation S206 may be performed, in which a second OLT transmits information on an ONU, while other operation is omitted.

Referring to FIG. 5, the first OLT arbitrarily requests the second OLT for the information on the ONU in S204. In response to a receipt of the request, the second OLT transmits the requested information on the ONU to the first OLT in S206. Then, the first OLT having received the information on the ONU adds the information on the ONU to a list of registered ONUs in S208, and requests the second OLT to transmit a wavelength change instruction to the ONU in S210.

The second OLT transmits the wavelength change instruction to the ONU in S212. The wavelength change instruction is an instruction that requests the ONU to initiate connection to the first OLT. Operation S212 of transmitting the wavelength change instruction may be performed in response to a request from the first OLT, but the present disclosure is not limited thereto. For example, the second OLT may transmit a wavelength change instruction to an ONU after the second OLT receives a request from a system operator, after a predetermined period of time has been lapsed since the procedure was initiated, or immediately after the second OLT transmits information on the ONU to the first OLT.

The wavelength change instruction that is transmitted to the ONU in 212 may include ONU ID, indicating ONU ID of the ONU that will change a wavelength, and information on another wavelength to which the ONU will change the wavelength. The information on another wavelength may include at least information on a pair of destination wavelengths necessary for changing the wavelength, that is, information on wavelengths which are a downstream signal wavelength and an upstream signal wavelength used by the first OLT to provide a service. In addition, the wavelength change instruction may include information on a point of time when the ONU initiates a tuning process to change a wavelength. In this embodiment, there is not limitation on a message format of the wavelength change instruction. For example, the wavelength change instruction may be a downstream Physical Layer Operation Administration Maintenance (PLOAM), but the present disclosure is not limited thereto.

After the wavelength change instruction is transmitted from the second OLT to the ONU, the ONU may, in some cases, transmit an acknowledgement message (Ack) to the second OLT in S214. Then, the second OLT may notify the first OLT that the wavelength change instruction has been normally received in S216. However, operation S214 and operation S216 are not necessarily required, and at least one of operation S214 and operation S216 may be omitted according to a configuration or a policy of the system. For example, as described above, operation S210 in which the first OLT requests the second OLT to transmit a wavelength change instruction to the ONU may not be performed, and thus, operation S216, in which the second OLT notifies the first OLT that the wavelength change instruction has been normally received, may not be performed as well. In addition, in the case of a system in which an ONU cannot arbitrarily make a decision with respect to a request or an instruction received from an OLT, the ONU may not necessarily perform operation S214 of transmitting an acknowledgement message (Ack) in response to receipt of a wavelength change instruction.

Then, in response to the wavelength change instruction received from the second OLT, the ONU starts to change an operating wavelength, or in other words, starts a tuning process in S218. FIG. 5 demonstrates a case that operation S218 is performed after operation S214 and S216, but it is merely exemplary. That is, in response to the receipt of the wavelength change instruction, the ONU may perform operation S218 immediately regardless of whether to perform operation S214 and S216 or even without performing operation S214 and S216.

In one embodiment, the ONU may perform a tuning process through the following detailed procedures in operation S218. Specifically, an ONU which has received the wavelength change instruction makes preparation for changing a wavelength and a predetermined period of time may be given for the preparation. The preparation includes a process in which the ONU sets necessary parameters before a tunable transceiver actually starts to tune a wavelength. Then, the ONU actually starts to tune (change) a wavelength of the tunable transceiver. Then, if necessary, the ONU may perform frame synchronization for a downstream signal.

The first OLT transmits a discovery grant signal to the ONU in S220. The discovery grant signal may be an upstream discovery grant signal, for example, an upstream PLOAM grant signal. According to an exemplary embodiment, the first OLT may transmit a downstream PLOAM acknowledgement request signal along with the discovery grant signal. According to an aspect of this embodiment, after the wavelength change instruction is transmitted to the ONU in operation S214, the first OLT may periodically transmits both of the discovery grant signal and the downstream PLOAM acknowledgement request signal to the ONU. The first OLT may continue transmitting the discovery grant signal and the downstream PLOAM acknowledgement request signal to the ONU until a response notifying that the discovery grant signal has been normally received is transmitted from the ONU or until a predetermined timer expires.

As such, in the event that the discovery grant signal and the downstream PLOAM acknowledgement request signal are transmitted from the first OLT, the ONU which has tuned a wavelength in operation S218 (that is, an ONU which is synchronized to a downstream signal transmitted from the first OLT) may normally receive the discovery grant signal in S220. In other words, operation S220 shown in FIG. 5 indicates a process of normally receiving a discovery grant signal whose wavelength has been tuned in operation S218 among a plurality of discovery grant signals that have been periodically transmitted from the first OLT ever since operation S212.

In the case of receiving the downstream PLOAM acknowledgment request signal and the discovery grant signal in S220, the ONU request the first OLT to establish communication link thereto in operation S222. A signal designed to request communication link may be a signal notifying receipt of an upstream discovery grant signal, and may notify that the ONU has tuned a wavelength. In response to the receipt of the request to establish communication link, the first OLT establishes communication link to the ONU, and thus, the ONU is normally provided with a service using a pair of wavelengths (an upstream signal wavelength and downstream signal) of the first OLT in operation S224.

Figure 6:
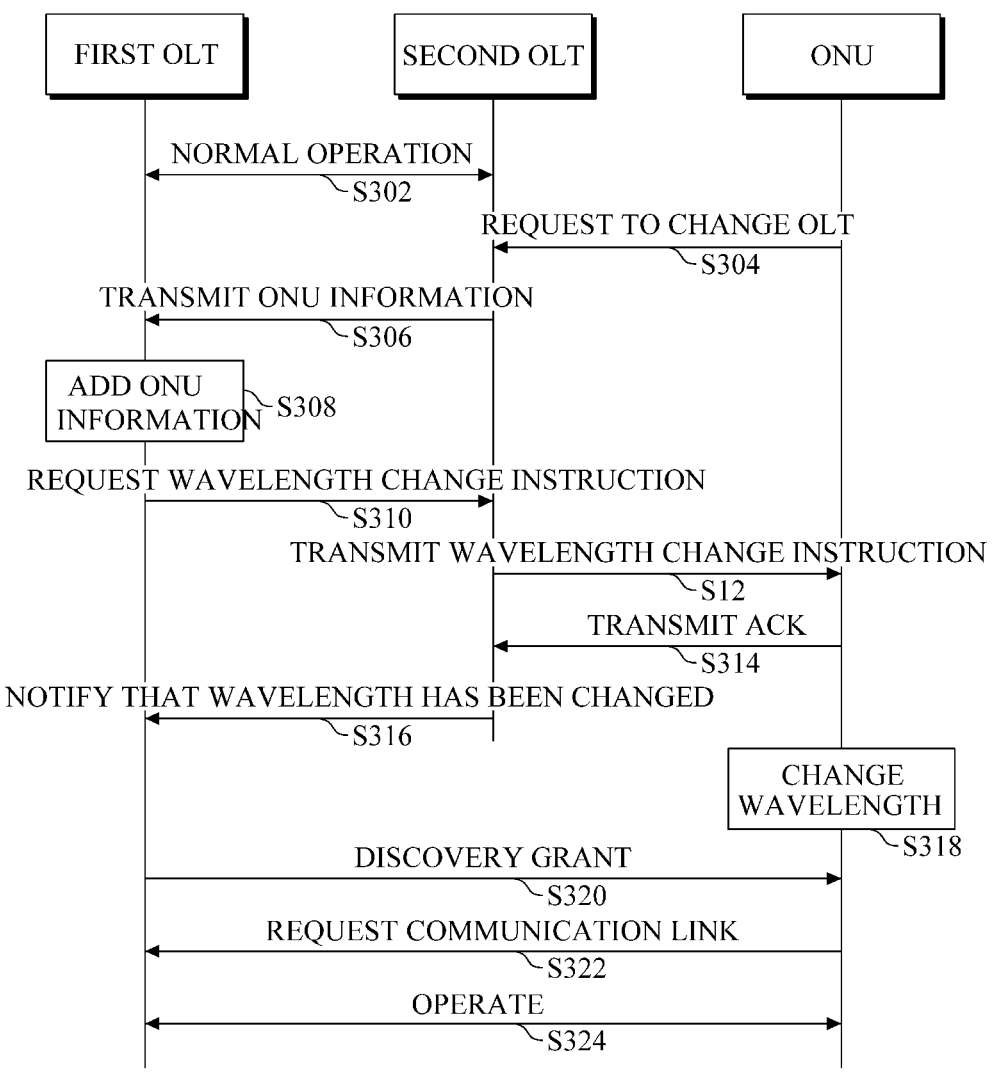
FIG. 6 is a flow chart illustrating a communication link method for according to another exemplary embodiment.

FIG. 6 is a flow chart illustrating a communication link method according to another exemplary embodiment. The flow chart in FIG. 6 is an example in which an ONU switches the first OLT to which the ONU has established communication link to the second OLT. The only difference of the communication link methods in FIG. 6 from that of FIG. 5 is that the second OLT transmits information on the ONU to the first OLT in response to a request from the ONU, rather than a request from the first OLT. Apart from the above different, the communication link method of FIG. 6 is substantially identical to the communication link method of FIG. 5. Thus, the communication link method in FIG. 6 is described briefly in the following. Therefore, for any description not provided herein, the same description provided above with reference to FIG. 5 may be applied.

Referring to FIG. 6 the first and second OLTs are in normal operation in S302. The ONU requests to switch the second OLT to which the ONU has established communication link to the first OLT in S304. In response to the request from the ONU, the second OLT transmits equipment specific information of the ONU to the first OLT, and the first and second OLTs communicate with each other to exchange necessary information in S306 to S310. More specifically, in response to the receipt of the request from the ONU, the second OLT transmits the requested information on the ONU to the OLT in S306. The first OLT having received the information on the ONU adds the received information on the ONU to a list of registered ONUs in S308, and then requests the second OLT to transmit a wavelength change instruction to the ONU in 310.

The second OLT transmits the wavelength change instruction to the ONU in S312. The wavelength change instruction is an instruction that directs the ONU to requests the first OLT to initiate a communication link process. In addition, the wavelength change instruction may include ONU identification (ONU ID) of the ONU that will change a wavelength, and information on another wavelength to which the ONU will change the wavelength. Further the wavelength change instruction may further include information on a point of time when the ONU starts a tuning process to change a wavelength. In response to the wavelength change instruction received from the second OLT, the ONU may transmit an acknowledgment message (Ack) to the second OLT in S314, according to an exemplary embodiment. Then, the second OLT may notify the first OLT that the wavelength change instruction has been normally transmitted to the ONU in S316.

In response to the wavelength change instruction from the second OLT, the (ONU starts to change a wavelength to an operating wavelength thereof in S318. Then, the first OLT transmits a discovery grant signal to the ONU in S320. According to one aspect of this embodiment, after operation S314 of transmitting the wavelength change instruction, the first OLT may periodically transmit the discovery grant signal to the ONU, as described above. In the event that the discovery grant signal is periodically transmitted from the first OLT, the ONU, which has tuned a wavelength thereof to change the wavelength in operation S318, normally receives the discovery grant signal in S320. In response to the discovery grant signal that is received in S320, the ONU requests the first OLT to establish communication link thereto in S322, and then is provided with a service using a pair of wavelengths (that is, an upstream signal wavelength and a downstream signal wavelength) of the first OLT in S324.

Figure 7:
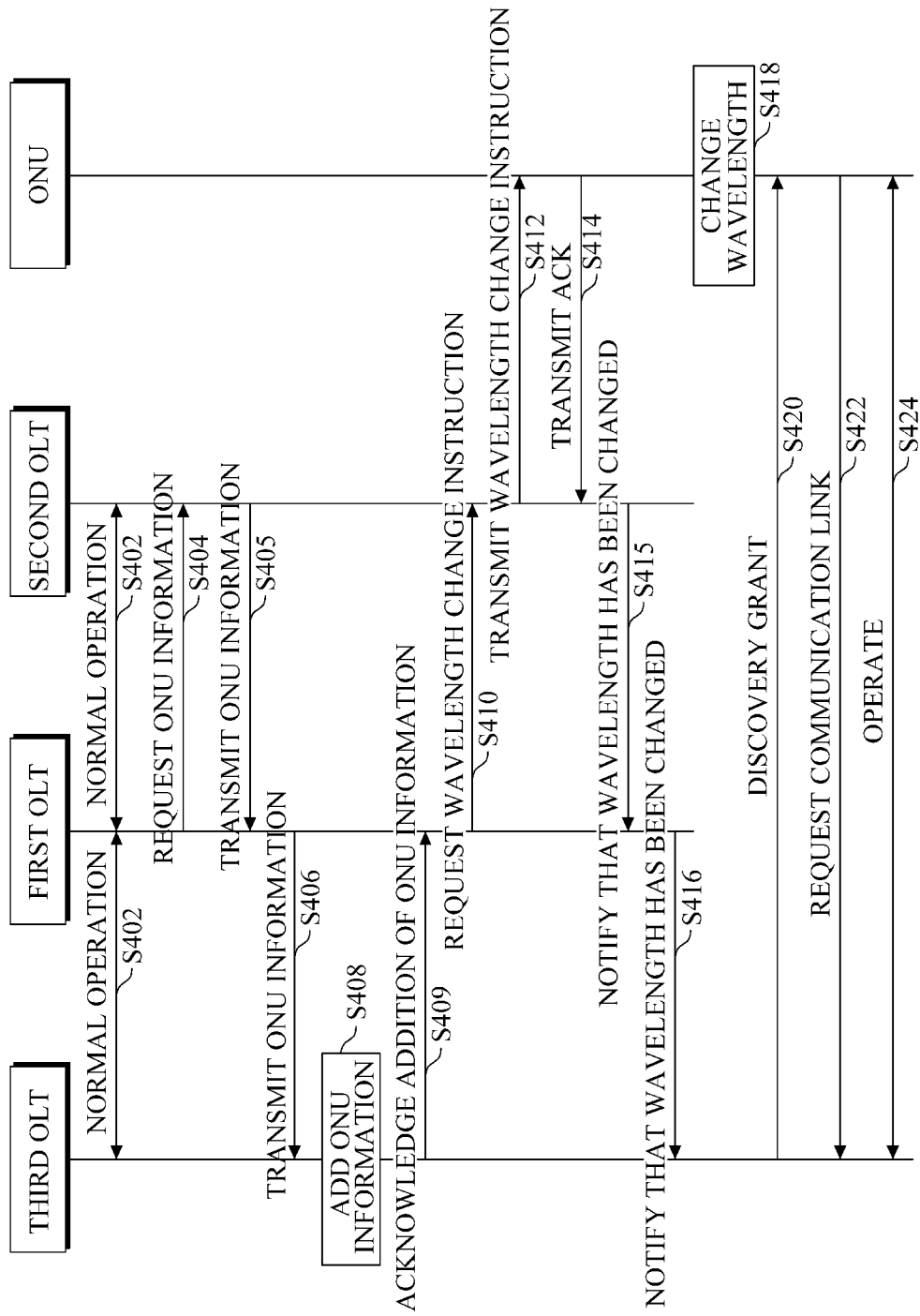
FIG. 7 is a flow chart illustrating a communication link method according to another exemplary embodiment.

FIG. 7 is a flow chart illustrating a communication link method according to another exemplary embodiment. The flow chart in FIG. 7 is an example in which an ONU switches a second OLT to which the ONU has established communication link to a third OLT. The only differences of the communication link method in FIG. 7 from those of FIGS. 5 and 6 are that a first OLT relays communication between the second and third OLTs and that OLTs are switched in response to a request from the first OLT. Apart from the above differences, the communication link method is FIG. 7 is substantially identical to those of FIGS. 5 and 6. Hereinafter, the communication link method of FIG. 7 is described briefly in the following, and, for any descriptions not provided herein, the same description provided above with reference to FIG. 5 may be applied. The first OLT of FIG. 7 may be the master OLT 112a of FIG. 4, and the second and third OLTs are slave OLTs 112b of FIG. 4, but the present disclosure is not limited thereto.

Referring to FIG. 7, normal operation is performed between the first and second OLTs and between the first and third OLTs in S402. The first OLT requests the second OLT for information on an ONU in S404, and then operation S405 to S410 are performed in which the second OLT transmits the information on an ONU to the first OLT and the second and third OLTs communicates with each other through the first OLT, which acts as a relay, so that the second and third OLTs may exchange necessary information. More specifically, in response to receipt of a request from an ONU, the second OLT transmits information on the ONU to the first OLT in S405, and the first OLT transmits the received information on the ONU to the third OLT in S406. The third OLT having received the information on the ONU adds the received information on the ONU to a list of registered ONUs in S408, and transmits an acknowledgement message to the first OLT to notify the addition of the information on the ONU in S409. The first OLT requests the second OLT to transmit a wavelength change instruction to the ONU in S410.

Then, the second OLT transmits the wavelength change instruction to the ONU S412. The wavelength change instruction is an instruction that requests the ONU to establish communication link to the third OLT, and the wavelength change instruction may include ONU identification (ONU ID) of the ONU that will change a wavelength, and information on another wavelength to which the ONU will change the wavelength. In addition, the wavelength change instruction may further include information on a point of time when the ONU starts a tuning process to change the wavelength. In response to the wavelength change instruction received from the second OLT, the ONU may transmit an acknowledgement message to the second OLT in S414, according to an exemplary embodiment. The second OLT notifies the first OLT that the wavelength change instruction has been normally transmitted to the ONU in S415. In addition, the first OLT notifies the third OLT that the wavelength change instruction has been normally transmitted to the ONU in S416.

In response to the wavelength change instruction from the second OLT, the ONU starts to change an operating wavelength in S418. The third OLT transmits a discovery grant signal to the ONU in S420. According to an aspect of this embodiment, after operation S414 of transmitting the wavelength change instruction to the ONU, the third OLT periodically transmits a discovery grant signal to the ONU, as described above. In the case where the discovery grant signal is periodically transmitted from the third OLT, the ONU, which has tuned a wavelength in S418, may normally receive the discovery grant signal in S420. After receiving the discovery grant signal in S420, the ONU requests the third OLT to establish communication link thereto in S422. The ONU is normally provided with a service using a pair of wavelengths (an upstream signal wavelength and a downstream signal wavelength) of the third OLT in S424.

Referring to FIGS. 4 to 7, the above-described communication link method relates to a case where an ONU switches one OLT to which the ONU has established communication link to a different OLT in the TWDM-PON system. However, the communication link method may be applied even in a case where an ONU has not established communication connected to any OLT, or, in other words, where an ONU has not established communication connected to a particular OLT within a TWDM-PON. The particular OLT is an OLT which does not include information on the ONU to which the particular OLT is to be connected.

Figure 8:
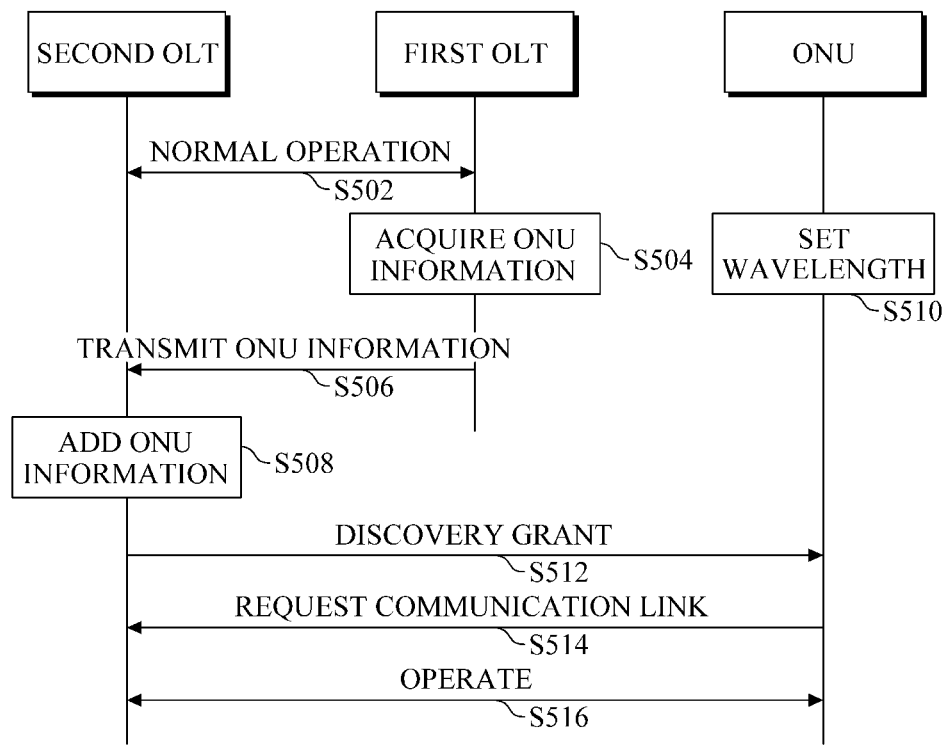
FIG. 8 is a flow chart illustrating a communication link method according to another exemplary embodiment.

FIG. 8 is a flow chart illustrating a communication link method of a TWDM-PON system according to another exemplary embodiment. As described above, the flow chart in FIG. 8 is an example in which an ONU was not connected to any OLT in the system before being connected to a second OLT. The difference of the communication link method in FIG. 8 from the above-described communication link methods is that an ONU was not connected to any other ONU before being connected to the second OLT, and thus, this embodiment is described briefly in the followings. Therefore, for any description not provided herein, the same description provided above with reference to FIG. 4 may be applied.

Referring to FIG. 8, the first and second OLTs are in normal communication in S502. The normal operation indicates a state in which the first and second OLTs are able to communicate with each other through an OLT communicator (not shown) provided in the system. In this embodiment, it may be determined that an ONU, which is newly registered with the system, is to be connected first to the second OLT. In this embodiment, there is no specific limitation on a subject or a reason that determines an OLT to which the ONU is to be connected first.

In response to a determination that the ONU is to be connected to the second OLT, the first OLT obtains information on the ONU in S504. The first OLT may be a master OLT that is responsible for management of the TWDM-PON system. The first OLT provides the information on the ONU, such as equipment specific information of the ONU, to the second OLT (which is to be connected to the ONU) in S506. Then, the second OLT having received the information on the ONU adds the received information on the ONU to a list of registered ONU in S508.

An ONU, which is to be registered with the TWDM-PON system or which wants to use a service of the TWDM-PON system, sets an operating wavelength thereof in S510. Operation S510 of setting an operating wavelength may be performed immediately after this process begins. The operating wavelength includes a receipt wavelength for a downstream signal and a transmission wavelength for an upstream signal. In a case where frame synchronization is not performed for a downstream signal during operation S510 of setting a wavelength, the ONU may change a reception wavelength into a different wavelength (in this case, according to the communication link method described with reference to FIGS. 5 to 7, an OLT to which an ONU has established communication link may be changed, and thus, an operating wavelength of the ONU may be tuned.

The second OLT transmits a discovery grant signal to the ONU in S512. According to an aspect of this embodiment, the second OLT may periodically transmit the discovery grant signal to the ONU after receiving information on the ONU. In addition, the second OLT may continue transmitting the discovery grant signal to the ONU until the discovery grant signal is received normally or until a predetermined timer expires.

As such, after the discovery grant signal is periodically transmitted from the second OLT, the ONU which has set or tuned a wavelength in S510 may normally receive the discovery grant signal normally in S512. That is, operation S512 in FIG. 8 indicates a process of normally receiving a discovery grant signal of a wavelength tuned in operation S510 from among discovery grant signals that have been periodically transmitted from the second OLT ever since operation S508.

After receiving the discovery grant signal in operation S512, the ONU requests the second OLT to establish communication link thereto in S514. In operation S514, a signal designed to request communication link may be a signal that notifies the second OLT that the ONU has normally tuned a wavelength. In response to a request from the ONU to establish communication link, the second OLT establishes communication link to the second OLT, and thus, the ONU is normally provided with a service using a pair of wavelengths (an upstream signal wavelength and a downstream signal wavelength) of the second OLT in S516

According to the above-described exemplary embodiments, it is possible to switch an OLT to which an ONU has established communication link to another OLT in a TWDM-PON system, so that load balancing across a plurality of PON links may be achieved, power consumption of the system may be reduced, and unnecessary use of network resources may be prevented.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Time Wavelength Division Multiplexing-Passive Optical Network (TWDM-PON) system, comprising:
a service provider equipment configured to comprise a plurality of Optical Line Terminals (OLTs) and an OLT communicator, wherein each of the plurality of OLTs is configured to provide a service using an optical signal of a different wavelength in Time Division Multiplexing (TDM) scheme, and the OLT communicator is configured to support communication among the plurality of OLTs;
a subscriber equipment configured to comprise a plurality of Optical Network Units (ONUs), each of the plurality of ONUs that utilizes a service provided from one of the plurality of OLTs using an arbitrary wavelength selected according to a wavelength control of the service provider equipment; and
an Optical Distribution Network (ODN) configured to transmit multi-wavelength downstream optical signals from the service provider equipment to the subscriber equipment, and transmit multi-wavelength upstream optical signals from the subscriber equipment to the service provider equipment, wherein
the plurality of OLTs comprises a first OLT and a second OLT, and a first ONU of the plurality of the ONUs, which have established a communication link to the first OLT, establishes a communication link to the second OLT, and
the OLT communicator is further configured to transmit equipment specific information of the first ONU to the second OLT.

2. The TWDM-PON system of claim 1, wherein the equipment specific information of the first ONU comprises ONU identification (ONU ID) and a serial number of the first ONU.

3. The TWDM-PON system of claim 1,
wherein the first OTL transmits a wavelength change instruction to the first ONU in order to change a wavelength thereof to an operating wavelength allocated to the second OLT,
wherein the second OLT periodically transmits an upstream discovery grant signal to the first ONU.

4. The TWDM-PON system of claim 3, wherein the wavelength change instruction comprises ODN ID of the first ONU and information about the operating wavelength allocated to the second OLT.

5. The TWDM-PON system of claim 4, wherein the wavelength change instruction further comprises information on a point of time when the first ONU starts a tuning process to change the wavelength thereof.

6. The TWDM-PON system of claim 3, wherein the second OLT is further configured to periodically transmit the upstream discovery grant signal until a message notifying receipt of the upstream discovery grant signal is received from the first ODN or until a predetermined timer expires.

7. The TWDM-PON system of claim 3, wherein the second OLT transmits the upstream discovery grant signal to the first ONU after the first OLT transmits the wavelength change instruction to the first ONU.

8. The TWDM-PON system of claim 3, wherein the first ONU changes the wavelength thereof to the operating wavelength allocated to the second OLT, immediately after receiving the wavelength change instruction.

9. The TWDM-PON system of claim 8, wherein the changing the wavelength thereof comprises making preparation to change a wavelength, changing a wavelength of a tunable transceiver included in the first ONU, and change the wavelength to synchronize to a downstream signal transmitted from the second OLT.

10. A communication link method for establishing a communication link in a Time Wavelength Division Multiplexing-Passive Optical Network (TWDM-PON) system, wherein a first Optical Network Unit (ONU) which has established a communication link to a first Optical Line Terminal (OLT) establishes a communication link to a second OLT, the communication method comprising:
   receiving from the first OLT a wavelength change instruction requesting to change a wavelength to an operating wavelength allocated to the second OLT;
   in response to the wavelength change instruction, changing the wavelength to synchronize to a downstream signal of the operating wavelength; and
   receiving an upstream discovery grant signal from the second OLT and transmitting a signal notifying receipt of the upstream discovery grant signal to the second OLT.

11. The communication link method of claim 10, wherein the second OLT receives equipment specific information of the first ONU before transmitting the upstream discovery grant signal.

12. The communication link method of claim 11, wherein the equipment specific information comprises an ONU identification (ONU ID) and a serial number of the first ONU.

13. The communication link method of claim 10,
   wherein the TWDM-PON system further comprises an OLT communicator configured to support communication between a plurality of OLTs.

14. The communication link method of claim 10, wherein the wavelength change instruction comprises an ONU ID of the first ONU and information on the operating wavelength allocated to the second OLT.

15. The communication link method of claim 14, wherein the wavelength change instruction further comprises information on a point of time when the first ONU starts a tuning process to change a wavelength.

16. The communication link method of claim 10, wherein the second OLT periodically transmits the upstream discovery grant signal until a message notifying receipt of the upstream discovery grant signal is received from the first ONU or until a predetermined timer expires.

17. The communication link method of claim 10, wherein the second OLT transmits the upstream discovery grant signal to the first ONU after the first OLT transmits the wavelength change instruction to the first ONU.

18. The communication link method of claim 10, wherein the first ONU changes the wavelength to the operating wavelength allocated to the second OLT, immediately after receiving the wavelength change instruction.

19. The communication link method of claim 18, wherein the changing of the wavelength comprises making preparation to change a wavelength, changing a wavelength of a tunable transceiver included in the first ONU, and synchronizing to a downstream signal transmitted from the second OLT.

* * * * *